United States Patent
Lee et al.

(10) Patent No.: US 10,763,532 B2
(45) Date of Patent: Sep. 1, 2020

(54) ELECTROLYTE STORAGE UNIT FOR REDOX FLOW BATTERY AND VANADIUM REDOX FLOW BATTERY COMPRISING SAME

(71) Applicant: LG CHEM, LTD., Seoul (KR)

(72) Inventors: Jeongbae Lee, Daejeon (KR); Tae Geun Noh, Daejeon (KR); Sikwon Moon, Daejeon (KR); Sujin Byun, Daejeon (KR); Joon Ho Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 68 days.

(21) Appl. No.: 16/083,684

(22) PCT Filed: Sep. 21, 2017

(86) PCT No.: PCT/KR2017/010370
§ 371 (c)(1),
(2) Date: Sep. 10, 2018

(87) PCT Pub. No.: WO2018/070683
PCT Pub. Date: Apr. 19, 2018

(65) Prior Publication Data
US 2019/0103622 A1    Apr. 4, 2019

(30) Foreign Application Priority Data
Oct. 13, 2016    (KR) .................. 10-2016-0132669

(51) Int. Cl.
*H01M 8/18*    (2006.01)
*H01M 8/20*    (2006.01)
(Continued)

(52) U.S. Cl.
CPC ............ *H01M 8/188* (2013.01); *G01F 23/24* (2013.01); *H01M 8/0482* (2013.01);
(Continued)

(58) Field of Classification Search
CPC .... H01M 8/188; H01M 8/18; H01M 8/04276; H01M 8/04776; H01M 8/0482; H01M 8/20
See application file for complete search history.

(56) References Cited

U.S. PATENT DOCUMENTS

| 2010/0094468 A1 | 4/2010 | Sahu et al. |
| 2014/0057140 A1 | 2/2014 | Bendert et al. |

(Continued)

FOREIGN PATENT DOCUMENTS

| CN | 104143651 A | 11/2014 |
| JP | 7-192748 A | 7/1995 |

(Continued)

OTHER PUBLICATIONS

European Search Report for Appl. No. 17859734.0 dated May 13, 2019.

(Continued)

*Primary Examiner* — Ula C Ruddock
*Assistant Examiner* — Frank A Chernow
(74) *Attorney, Agent, or Firm* — Birch, Stewart, Kolasch & Birch, LLP (57) ABSTRACT

The present invention relates to an electrolyte storage unit applicable to redox flow batteries and a vanadium redox flow battery including the same. The electrolyte storage unit for redox flow batteries of the present invention can be useful in minimizing a contact area of an electrolyte with the air to improve a self-discharge phenomenon of a battery and solving a problem such as an imbalance between a concentration and a volume of the electrolyte, which is caused during battery driving. Accordingly, a cycle of a process of regenerating an electrolyte can be delayed, and capacity and lifespan characteristics of the battery can be improved. Also, the electrolyte storage unit of the present invention can be (Continued)

easily handled and installed because electrolytes may not be easily mixed even by external impact.

6 Claims, 6 Drawing Sheets

(51) Int. Cl.
    *H01M 8/04276*     (2016.01)
    *G01F 23/24*     (2006.01)
    *H01M 8/04746*     (2016.01)
    *H01M 8/04791*     (2016.01)

(52) U.S. Cl.
    CPC ... *H01M 8/04276* (2013.01); *H01M 8/04776* (2013.01); *H01M 8/18* (2013.01); *H01M 8/20* (2013.01); *Y02E 60/528* (2013.01)

(56) References Cited

U.S. PATENT DOCUMENTS

| | | | |
|---|---|---|---|
| 2016/0006051 A1 | 1/2016 | Winter et al. | |
| 2016/0133914 A1* | 5/2016 | Oh | H01M 2/021 |
| | | | 429/53 |
| 2016/0315337 A1 | 10/2016 | Perry et al. | |
| 2017/0271694 A1 | 9/2017 | Jeong et al. | |

FOREIGN PATENT DOCUMENTS

| | | |
|---|---|---|
| JP | 10-281110 A | 10/1998 |
| JP | 2000-149779 A | 5/2000 |
| JP | 2003-303611 A | 10/2003 |
| JP | 2006-147375 A | 6/2006 |
| JP | 2007-188729 A | 7/2007 |
| JP | 2007-311209 A | 11/2007 |
| JP | 2013-25964 A | 2/2013 |
| JP | 2013-37814 A | 2/2013 |
| JP | 5148842 B2 | 2/2013 |
| KR | 10-2001-0011376 A | 2/2001 |
| KR | 10-2008-0112154 A | 12/2008 |
| KR | 20-2012-0000414 U | 1/2012 |
| KR | 10-1558081 B1 | 10/2015 |
| KR | 10-2016-0060800 A | 5/2016 |
| KR | 10-2016-0074430 A | 6/2016 |
| KR | 10-2016-0085113 A | 7/2016 |
| KR | 10-2017-0105765 A | 9/2017 |
| WO | WO 2015/099728 A1 | 7/2015 |
| WO | WO 2016/099217 A1 | 6/2016 |

OTHER PUBLICATIONS

Corcuera et al., "State-of-Charge Monitoring and Electrolyte Rebalancing Methods for the Vanadium Redox-Flow Battery", European Chemical Bulletin, vol. 1, No. 12, 2012, pp. 511-519.
International Search Report issued in PCT/KR2017/010370 (PCT/ISA/210), dated Jan. 5, 2018.

* cited by examiner

ELECTROLYTE STORAGE UNIT FOR REDOX FLOW BATTERY AND VANADIUM REDOX FLOW BATTERY COMPRISING SAME

TECHNICAL FIELD

This application claims priority to and the benefit of Korean Patent Application No. 10-2016-0132669, filed Oct. 13, 2016, the disclosure of which is incorporated herein by reference in its entirety.

The present invention relates to an electrolyte storage unit applicable to redox flow batteries and a vanadium redox flow battery including the same.

BACKGROUND ART

With the increasing global awareness of problems regarding environmental pollution and global warming caused due to the dramatic increase in demand for energy and the use of fossil fuels, renewable energy has attracted attention as a future energy source. However, renewable energy has a serious difficulty in establishing a power supply plan because stable power supplies are impossible due to a large power variation according to a change in climate environment. As an alternative to solve the above problems, the importance of an energy storage system (ESS) configured to store electric power which is not consumed and supply the electric power when power supplies are required has emerged all over the world.

The ESS may be used for various purposes throughout the power networks spanning from power plants generating electric power to consumers. In this case, the ESS is used to store idle electric power during a light load (night time) condition and utilize the electric power during an overload (day time) condition, thereby optimizing operation of electric power through load leveling. As technology for the ESS, there are various types of technology such as secondary battery technology, super-capacitor technology, flywheel technology, compressed air energy storage, pumping-up power generation, and the like. The secondary battery technology, which has no geographic restrictions and may be installed in various capacities, has attracted the most attention as the technology for the ESS.

Among secondary batteries, a redox flow battery is a system in which an active material in an electrolyte is oxidized/reduced to charge/discharge the battery, that is, an electrochemical storage system configured to directly store chemical energy of the electrolyte as electrical energy. Much research has been currently conducted to develop redox flow batteries as large-capacity secondary batteries because the redox flow batteries may be manufactured with large capacity, have low maintenance and repair costs, are operable at room temperature, and have a characteristic of independently designing capacities and outputs.

Among these, a vanadium redox flow battery using vanadium ions has attention because it has an advantage in that a vanadium active material is not consumed because positive and negative electrodes are charged and discharged with any change in oxidation number while the active material is circulated between the positive and negative electrodes.

However, to commercialize the vanadium redox flow battery, a plan is required to solve a decline in capacity of the batteries caused due to a separator cross-over phenomenon of vanadium ions, generation of hydrogen in a negative electrode, and oxidation of vanadium ions when exposed to air, and the like.

Prior-Art Document

[Patent Document]
Patent Document 1: Korean Registered Patent No. 10-1558081 entitled "Redox Flow Battery"

DISCLOSURE

Technical Problem

To solve the above problems, the present inventors have conducted research on a method capable of passively regenerating an electrolyte and a device capable of realizing the same. Therefore, the present invention has been completed based on the facts.

Therefore, it is an object of the present invention to provide an electrolyte storage unit for redox flow batteries.

It is another object of the present invention to provide a vanadium redox flow battery including the electrolyte storage unit.

Technical Solution

To solve the above problems, according to an aspect of the present invention, there is provided an electrolyte storage unit for redox flow batteries, which comprises a positive electrode electrolyte storage tank and a negative electrode electrolyte storage tank, wherein each of the positive electrode electrolyte storage tank and the negative electrode electrolyte storage tank includes a water level sensing pipe protruding perpendicularly from one end thereof, wherein the water level sensing pipe has a water level sensor provided therein, and the electrolyte storage unit comprises:

a "∩"-shaped electrolyte transfer pipe having a pump provided at a central end thereto to equally adjust a water level of an electrolyte in each of the tanks, wherein one and the other ends of the transfer pipe are disposed to be inserted in a state in which the one and the other ends of the transfer pipe are spaced apart a predetermined distance from the inside sidewall of the water level sensing pipe of each of the tanks, and an electrical control unit configured to measure a water level of the electrolyte in each of the tanks using a water level sensor, thereby automatically operating the pump.

In this case, at least one of the positive electrode electrolyte storage tank and the negative electrode electrolyte storage tank may further include a check valve formed on upper portion thereof.

In this case, at least one of the positive electrode electrolyte storage tank and the negative electrode electrolyte storage tank may further include a pressure sensor formed therein and may include an electrical control unit configured to electrically connect the check valve to the pressure sensor so that the check valve is automatically operated according to an internal pressure of each of the storage tanks.

In this case, the check valve may include at least one selected from the group consisting of a lift check valve, a swing check valve, a ball check valve, a screw-down stop check valve, a butterfly check valve, a dual plate check valve, a single plate check valve, a tilting disc check valve, and a foot valve.

In this case, when it is assumed that a cross-sectional area of each of the positive electrode electrolyte storage tank and negative electrode electrolyte storage tank is A and a cross-sectional area of each of the water level sensing pipes of the electrolyte storage tanks is B, the ratio of A to B may be in a range of 2:1 to 100:1.

According to another aspect of the present invention, there is provided a vanadium redox flow battery including the electrolyte storage unit.

Advantageous Effects

The electrolyte storage unit for redox flow batteries of the present invention can be useful in minimizing a contact area of an electrolyte with the air to improve a self-discharge phenomenon of a battery and solving a problem such as an imbalance between a concentration and a volume of the electrolyte, which is caused during battery driving. Accordingly, a cycle of a process of regenerating an electrolyte can be delayed, and capacity and lifespan characteristics of the battery can be improved. Also, the electrolyte storage unit of the present invention can be easily handled and installed because electrolytes may not be easily mixed even by external impact.

BEST MODE

Hereinafter, preferred embodiments of the present invention will be described in detail with reference to the accompanying drawings. The drawings are shown to describe one exemplary embodiment of the present invention, and thus the present invention can be implemented in several different forms, and thus is not limited to the embodiments described herein. In order to describe embodiments of the present invention with greater clarity, certain parts irrelevant to the detailed description have been omitted in the drawings, and like parts are used to have like reference numerals throughout the specification. Also, the sizes and relative sizes of parts shown in the drawings are irrelevant to their actual scales, and may be exaggerated or diminished for the sake of convenience of description.

Unless specifically indicated otherwise in this specification, the term "vanadium ions" or "ions" refer to vanadium cations.

Electrolyte Storage Unit

Figure 1:
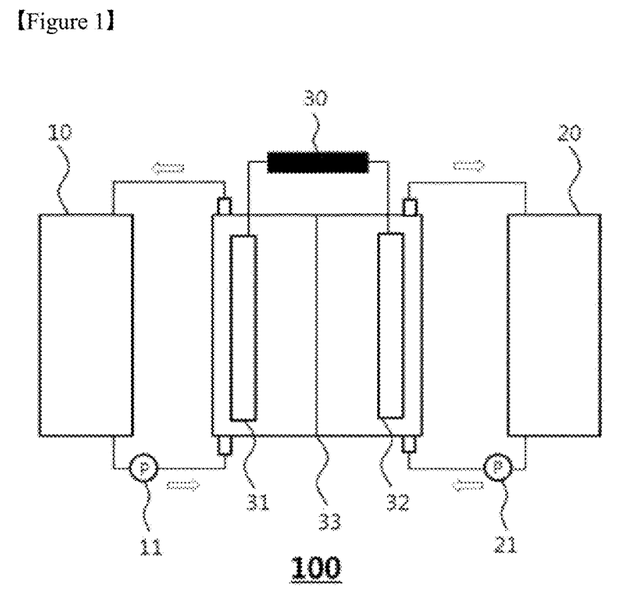
FIG. 1 is a diagram schematically showing a conventional configuration of a redox flow battery.

FIG. 1 is a diagram schematically showing a conventional configuration of a redox flow battery 100.

As shown in FIG. 1, the redox flow battery 100 includes a cell including a positive electrode 31, a negative electrode 32 and a separator 33, the positive electrode 31 and negative electrode 32 being connected to a power supply/load 30; a positive electrode electrolyte storage tank 10 configured to accommodate a positive electrode electrolyte supplied to the positive electrode 31; and a negative electrode electrolyte storage tank 20 configured to accommodate a negative electrode electrolyte supplied to the negative electrode 32.

A redox flow battery is a battery which is charged and discharged as an active material in an electrolyte is oxidized and reduced. In this case, electrolytes of electrolyte storage tanks 10 and 20 are supplied to a cell by means of pumps 11 and 21 to induce an oxidation/reduction reaction, thereby generating electrical energy. When a vanadium redox flow battery is discharged, pentavalent vanadium ions are reduced in a positive electrode 31 to form tetravalent vanadium ions, and bivalent vanadium ions are oxidized in a negative electrode 32 to form trivalent vanadium ions. On the other hand, when the vanadium redox flow battery is charged, the oxidation/reduction reaction occurs in the reverse direction.

However, such a vanadium redox flow battery has problems cased due to a separator cross-over phenomenon of vanadium ions.

Specifically, the vanadium redox flow battery includes a positive electrode electrolyte and a negative electrode electrolyte at a volume ratio of 1:1 and is composed of vanadium ions having different oxidation numbers, as described above. Here, when a cation exchange membrane is used as the separator, bivalent vanadium ions in the negative electrode more rapidly cross over the separator, compared to tetravalent or pentavalent vanadium ions in the positive electrode. Therefore, a vanadium concentration and volume of the negative electrode electrolyte decrease and a vanadium concentration and volume of the positive electrode electrolyte increase as the bivalent vanadium ions moves to the positive electrode during a charging/discharging cycle. On the other hand, when an anion exchange membrane is used as the separator, a water level of the negative electrode electrolyte continuously increases.

As such, when the ion balance between the positive electrode electrolyte and the negative electrode electrolyte is lost, a sudden decline in battery capacity may be caused. To restore this decline in battery capacity, a process of periodically regenerating an electrolyte is required. Such an electrolyte regeneration process requires an additional time and electrical and chemical energy, and has a major obstacle in commercializing the redox flow battery because the battery may not be operated during the regeneration process.

In the present invention, the problems are solved by maintaining constant concentrations and volumes of the positive and negative electrode electrolytes so that electrolytes are passively generated during battery driving without adding any energy.

Specifically, the present invention provides an electrolyte storage unit for redox flow batteries, which includes a positive electrode electrolyte storage tank and a negative electrode electrolyte storage tank, wherein each of the positive electrode electrolyte storage tank and the negative electrode electrolyte storage tank includes a water level sensing pipe protruding perpendicularly from one end thereof, wherein the water level sensing pipe has a water level sensor provided therein, and the electrolyte storage unit includes:

a "∩"-shaped electrolyte transfer pipe having a pump provided at a central end thereto to equally adjust a water level of an electrolyte in each of the tanks, wherein one and the other ends of the transfer pipe are disposed to be inserted in a state in which the one and the other ends of the transfer pipe are spaced apart a predetermined distance from the inside sidewall of the water level sensing pipe of each of the tanks, and an electrical control unit configured to measure a water level of the electrolyte in each of the tanks using a water level sensor, thereby automatically operating the pump.

The electrolyte storage unit of the present invention may immediately sense a change in volume of the electrolyte stored in each of the storage tank using the water level sensor provided in the water level sensing pipe. In this case, when an increase in volume of an electrolyte in one storage tank is sensed, an amount of the electrolyte increased is transferred to the other storage tank by means of an electrolyte transfer pipe having a pump. The ion balance between the positive and negative electrode electrolytes may be maintained by immediately correcting such an electrolyte volume, thereby significantly improving a decline in battery capacity of the redox flow battery.

Figure 2:
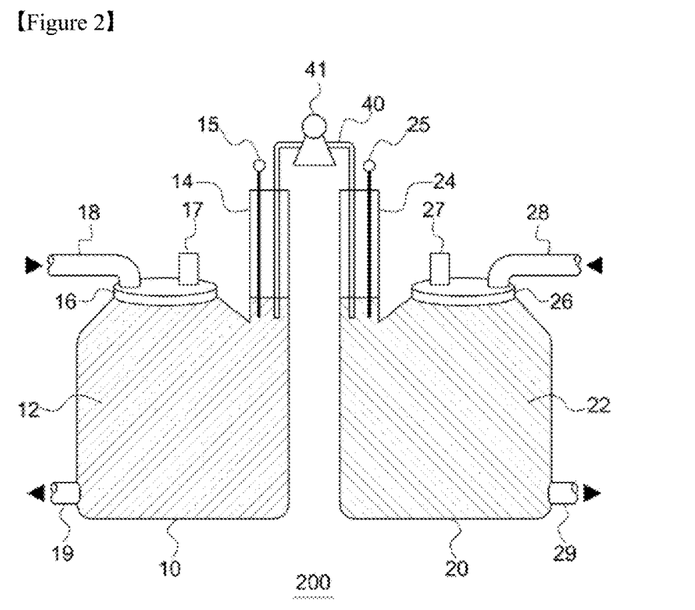
FIG. 2 is a cross-sectional view of an electrolyte storage unit according to one preferred embodiment of the present invention.

FIG. 2 is a cross-sectional view of an electrolyte storage unit according to one preferred embodiment of the present invention. Hereinafter, the present invention will be described in detail with reference to FIG. 2.

In an electrolyte storage unit 200 of the present invention, positive and negative electrode electrolyte storage tanks 10 and 20 include water level sensing pipes 14 and 24 protruding upwards from ends thereof, respectively. When the positive and negative electrode electrolyte storage tanks 10 and 20 have such water level sensing pipes 14 and 24, the positive and negative electrode electrolyte storage tanks 10 and 20 may be effective in sensing a subtle change in water level although the storage tanks have a large volume, and have an advantage in that the contact of the air with electrolytes 12 and 22 stored in the storage tanks may be minimized.

The water level sensing pipes 14 and 24 are installed to protrude upwards from upper portions 16 and 26 of the storage tanks 10 and 20, respectively. In this case, the water level sensing pipes 14 and 24 are preferably installed upright in a vertical direction, as shown in FIG. 2.

Conventional electrolyte storage tanks for redox flow batteries are used in a state in which the electrolyte storage tanks are partially filled with an electrolyte because the electrolyte storage tanks may not accommodate the electrolyte whose volume increases and decreases during a charging/discharging cycle when the battery is driven in a state in which the storage tanks are fully filled with the electrolyte. In this case, a self-discharge phenomenon may be caused because an active material in the electrolyte is oxidized in response to the air present in the storage tanks. To prevent this phenomenon, a method of purging an electrolyte storage tank with an inert gas such as nitrogen has been used. As a more basic method, a method of minimizing a contact area of an air bound with the electrolyte is needed.

To solve the above problems, the electrolyte storage unit 200 of the present invention is configured so that the electrolyte storage tanks 10 and 20 include the water level sensing pipes 14 and 24, respectively.

That is, in the electrolyte storage unit 200 of the present invention, the water level sensing pipes 14 and 24 protruding upwards from upper portions 16 and 26 of the storage tanks 10 and 20 may accommodate an amount of the electrolyte increased. Therefore, the storage tanks 10 and 20 may be used in a state in which regions of the storage tanks 10 and 20 other than the water level sensing pipes 14 and 24 are fully filled with electrolytes 12 and 22 so that the electrolytes 12 and 22 have no contact area with the air. When the storage tanks 10 and 20 are used in this way, the electrolytes stored in the storage tanks 10 and 20 are exposed to the air to the extent which corresponds to areas of the water level sensing pipes 14 and 24, thereby minimizing a self-discharge phenomenon caused by oxidation of the electrolyte.

The water level sensing pipes 14 and 24 are preferably in a narrow tubular shape so that the water level sensing pipes 14 and 24 can sensitively sense a change in volume of the electrolyte caused in the storage tanks 10 and 20. That is, as the same volume of the electrolyte increases and decreases, the smaller the cross-sectional area of a pipe is, the higher a water level difference (height difference) is. Therefore, the smaller the cross-sectional areas of the water level sensing pipes 14 and 24 are, the higher the sensitivity to an increase/decrease in volume of the electrolyte is.

More specifically, whet it is assumed that a cross-sectional area of each of the positive and negative electrode electrolyte storage tanks 10 and 20 is A and a cross-sectional area of each of the water level sensing pipes 14 and 24 of the electrolyte storage tanks, the ratio of A to B is preferably in a range of 2:1 to 100:1. When the ratio of A to B is less than 2:1, the cross-sectional area of each of the water level sensing pipes becomes too wide, which makes it difficult to immediately correct a volume of the electrolyte. On the other hand, when the ratio of A to B is greater than 100:1, a water level of the electrolyte may be sensed with very high sensitivity. In this case, electric power may be excessively consumed because water level sensors 15 and 25 and a pump 41 in an electrolyte transfer pipe are continuously operated. Therefore, the ratio of A to B is properly adjusted within this range.

A height of each of the water level sensing pipes 14 and 24 is not particularly limited as long as the height is a level height which may accommodate a volume of the electrolyte temporarily increased. In this case, a person having ordinary skill in the art may adjust the height of each of the water level sensing pipes 14 and 24, depending on the cross-sectional areas of the water level sensing pipes 14 and 24.

In the present invention, the water level sensing pipes 14 and 24 include water level sensors 15 and 25 formed therein and configured to sense a change in water level.

The water level sensors 15 and 25 are sensors that may sense a state which the water level falls out of a predetermined water level range, and are electrically connected to a pump provided in the electrolyte transfer pipe. Therefore, it is possible to immediately sense a change in water level of the electrolyte in the water level sensing pipe and automatically correct volumes of the electrolytes in both the water level sensing pipes 14 and 24.

The change in volume of the electrolyte sensed by the water level sensors 15 and 25 may be adjusted, when necessary. However, the water level sensors 15 and 25 may preferably sense a volume change of 20% or less, preferably a volume change of 0.001 to 1% with respect to the initial volume of the electrolyte to secure a passive regeneration effect of the electrolyte.

The passive regeneration of the electrolyte realized by the electrolyte storage unit 200 of the present invention is a method of passively regenerating an electrolyte by immediately transferring an amount of the electrolyte increased in one storage tank, which is caused due to a separator crossover phenomenon of vanadium ions during battery driving, to the other storage tank to maintain constant water levels of positive and negative electrode electrolytes, and distinguishes from conventional active regeneration requiring additional electrical and chemical energy.

Specifically, an active regeneration method is carried out by physically mixing positive and negative electrode electrolytes, supplying the positive and negative electrode electrolytes at a divided volume ratio of 1:1 to stacks and charging the positive and negative electrode electrolytes to generate vanadium ions having a positive tetravalent oxidation number and a negative trivalent oxidation number.

On the other hand, the passive regeneration is a method in which vanadium ions in a small amount of the electrolyte transferred to the counter electrode storage tank are regenerated into vanadium ions having the same oxidation number as the surrounding electrolyte through an oxidation/reduction reaction, and thus does not require additional energy. In this case, an amount of the electrolyte in the other storage tank to be transferred at once is less than or equal to 20%, more preferably in a range of 0.001 to 1% with respect to the total volume of the electrolyte in the one storage tank so that the electrolyte in the one storage tank is regenerated into ions having a proper oxidation number without causing any ion imbalance due to the electrolyte in the other storage tank to be transferred. Therefore, it is desirable for the water level sensors 15 and 25 to sense a change in volume in this range in terms of securing the effects of the present invention.

Unlike when the electrolytes of the positive and negative electrodes are mixed in large quantities at once, the ion imbalance is not caused and the ion and volume imbalance of the electrolyte caused by the separator cross-over phenomenon are continuously corrected when the electrolyte is transferred in small quantities to a counter electrode through a device such as the electrolyte storage unit 200 of the present invention. Therefore, the rate of decline in performance of the redox flow battery may be significantly reduced, and a cycle of an electrolyte regeneration process may be extended.

The electrolyte storage unit of the present invention includes a "⌒"-shaped transfer pipe 40 configured to connect the positive and negative electrode electrolyte storage tanks 10 and 20 so that an electrolyte can move therethrough when an increase/decrease in volume of the electrolyte is sensed by the water level sensors 15 and 25.

One end of the "⌒"-shaped transfer pipe 40 is disposed in the water level sensing pipe 14 of the positive electrode electrolyte storage tank 10 and the other end of the "⌒"-shaped transfer pipe 40 is disposed in the water level sensing pipe 24 of the negative electrode electrolyte storage tank 20 so that the positive and negative electrode electrolytes can move to each other.

In this case, a pump 41 is provided at a central end of the "⌒"-shaped transfer pipe 40. The pump 41 is connected to the water level sensors 15 and 25 by means of an electrical control unit (not shown), and thus serves to automatically transfer the electrolyte. Also, an amount of the electrolyte to be transferred at once and a flow rate of the electrolyte to be transferred may be adjusted by the pump 41.

Because the electrolyte storage unit 200 of the present invention includes the water level sensing pipes 14 and 24 protruding upwards therefrom and the "⌒"-shaped transfer pipe 40 disposed above the water level sensing pipes 14 and 24 as described above, the electrolyte storage unit 200 has advantages in that it is possible to passively regenerating the electrolyte, and the electrolyte storage unit 200 may be easily handled and installed because the electrolytes may not be unnecessarily mixed by external impact.

Meanwhile, at least one of the positive electrode electrolyte storage tank 10 and the negative electrode electrolyte storage tank 20 of the electrolyte storage unit according to the present invention may further include check valves 17 and 27 formed on upper portions 16 and 26 thereof.

Each of the check valves 17 and 27 is a unidirectional value configured to discharge gases (for example, hydrogen, oxygen, and the like) generated in the electrolyte storage unit 200 to maintain a constant internal pressure in the value.

The redox flow battery has a drawback in that gases may be generated in the cell due to a side reaction of the electrolyte with impurities. When such gases are continuously generated, the electrolyte storage unit is likely to be damaged by pressure. When oxygen is generated, the oxygen may promote oxidation of the active material to induce self-discharging of the battery. Therefore, the redox flow battery preferably has a means configured to discharge gases out of the cell when a pressure in the cell reaches a pressure over a predetermined pressure level.

Accordingly, in the present invention, the check valves 17 and 27 are provided above the electrolyte storage tanks 10 and 20, respectively, to maintain a constant inner pressure of the electrolyte storage unit 200.

Types of the check valves 17 and 27 that may be used herein are not particularly limited in the present invention, and valves generally used in the related art may be used. Non-limiting examples of the check valves may include a lift check valve, a swing check valve, a ball check valve, a screw-down stop check valve, a butterfly check valve, a dual plate check valve, a single plate check valve, a tilting disc check valve, and a foot valve.

Also, the electrolyte storage unit 200 of the present invention includes a pressure sensor (not shown) installed inside at least one of the positive and negative electrode electrolyte storage tanks 10 and 20, and an electrical control unit (not shown) configured to electrically connect the pressure sensor to the check valves 17 and 27. Therefore, the check valves 17 and 27 may be automatically opened with an increasing pressure to maintain a constant inner pressure of the electrolyte storage unit tanks 10 and 20.

Materials of the electrolyte storage tanks 10 and 20, the water level sensing pipes 14 and 24, the "⌒"-shaped transfer pipe 40, the pump 41, the check valves 17 and 27, the water level sensors 15 and 25, the pressure sensor (not shown), and the like, which constitute the electrolyte storage unit of the present invention, are not particularly limited in the present invention as long as the materials do not react with the electrolyte and have acid resistance.

Non-limiting examples of such materials may include one or more selected from the group consisting of a metal material whose inner surface is coated with an acid-resistant material, glass, polyvinyl chloride, polypropylene, polyethylene, polytetrafluoroethylene, polyvinylidene fluoride, chlorinated polyethylene, chlorinated polypropylene, poly(vinylidene difluoride), polyester, polycarbonate, polyalcohol, polysulfone, polyethersulfone, polyether, polyamide, polyimide, polyphenylene sulfide, poly(ether-ketone), poly(ether-ether-ketone), poly(phthalazinone-ether-ketone), polybenzimidazole, polystyrene, polyisobutylene, and polyacrylonitrile.

Vanadium Redox Flow Battery

A vanadium redox flow battery according to the present invention uses the electrolyte storage unit according to the present invention as the electrolyte storage unit.

When the electrolyte storage unit according to the present invention is used, problems regarding an electrolyte imbalance caused by a cross-over phenomenon of vanadium ions may be solved to significantly lower the rate of decline in performance of the battery and reduce the number of a separate electrolyte regeneration process, thereby enhancing operational efficiency of the battery.

A configuration of the vanadium redox flow battery including a positive electrode, a negative electrode, a separator and an electrolyte is not particularly limited in the present invention, and is reportedly known in the related art.

Because each of the positive and negative electrodes functions as a passage of electrons and serves as a place in which an oxidation/reduction reaction may occur, positive and negative electrodes having low resistance and good oxidation/reduction reaction efficiency are used. Positive and negative electrodes generally used in the related art may be used as the positive and negative electrodes. Preferably, carbon electrodes such as carbon felt, carbon cross, and the like are used.

An anion or cation exchange membrane is used as the separator. A vanadium-based electrolyte needs to have high acid resistance, oxidation resistance and selective permeability because an active material obtained by mixing a strong acid with a transition metal element is used as the electrolyte. For example, Nafion, CMV, AMV, DMV, and the like may be used. Preferably, Nafion may be used.

In the redox flow battery, the electrolyte includes an active material, and the vanadium electrolyte may be prepared by dissolving a vanadium oxide such as $V_2O_5$, $VOSO_4$, or $V_2(SO_4)_3$ in an acid such as sulfuric acid, hydrochloric acid, phosphoric acid, nitric acid, and the like and reducing the mixture with a reducing agent so that the vanadium electrolyte has a predetermined oxidation number. For example, a 1 M $VOSO_4$ solution may be prepared in 3 M $H_2SO_4$ to prepare an electrolyte of tetravalent vanadium ions, which may be then reduced by an electrochemical method to prepare an electrolyte of trivalent vanadium ions.

MODE FOR INVENTION

Hereinafter, preferred exemplary embodiments of the present invention will be described in order to aid in understanding the present invention. However, it should be understood that the description proposed herein is just a preferable example for the purpose of illustrations only. Therefore, it will be apparent to those skilled in the art that various changes and modifications can be made to the exemplary embodiments of the present invention without departing from the scope of the present invention, so it should be understood that the present invention covers all such changes and modifications provided they are within the scope of the appended claims and their equivalents.

Example

Preparative Example 1: Manufacture of Vanadium Redox Flow Battery

Figure 3:
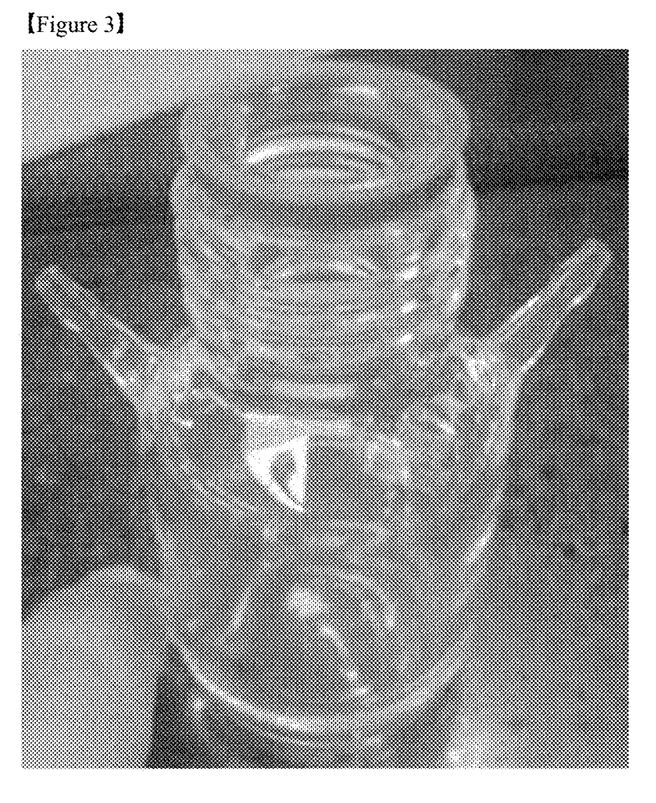
FIG. 3 is an image of a container used as an electrolyte storage tank manufactured in Preparative Example 1.
Figure 4:
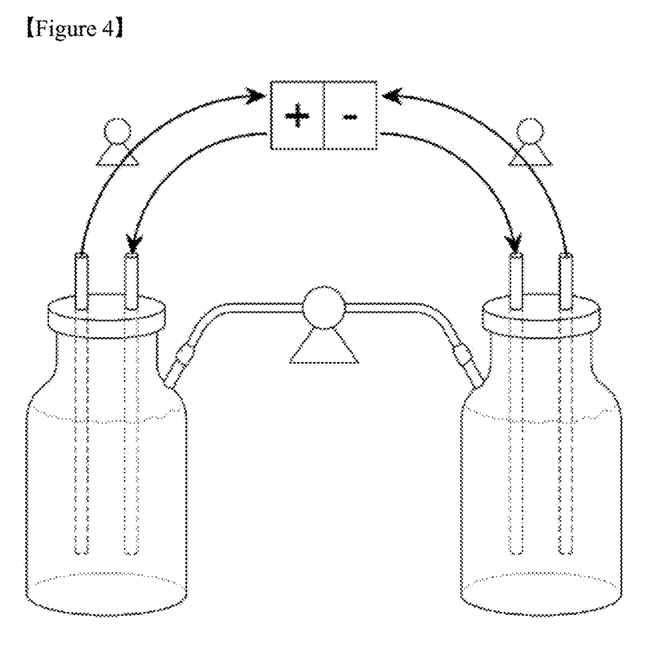
FIG. 4 is a diagram schematically showing a configuration of a battery manufactured in Preparative Example 1.

A container having narrow pipes provided at upper sides thereof as shown in FIG. 3 was used as the electrolyte storage tank to manufacture a vanadium redox flow battery, as shown in FIG. 4.

In this case, solutions obtained by electrochemically oxidizing/reducing 60 mL of a 1.6 M vanadium aqueous solution (Oxchem Corp.) were used as positive and negative electrode electrolytes, respectively, and a storage tank was purged with nitrogen after the storage tank was filled with the electrolyte. Carbon felt (XF30A) with a size of 50×50 mm was used as the electrode, and Nafion212 was used as the separator.

Experimental Example 1: Evaluation of Battery Performance

The battery manufactured in Preparative Example 1 was used in Example 1, and battery performance of the battery was evaluated. In this case, a redox flow battery having the same battery configuration as in Preparative Example 1, in which no electrolyte was transferred during battery driving, was used in Comparative Example. The battery driving conditions are as follows.

Electrolyte supply rate: 2 mL/min/cm$^2$

Charge/discharge current density: 100 mA/cm$^2$, constant current

Charge/discharge voltage: 0.8 to 1.7 V

Electrolyte supply rate by pump in transfer pipe: 0.3 mL/min/cm$^2$

Figure 5:
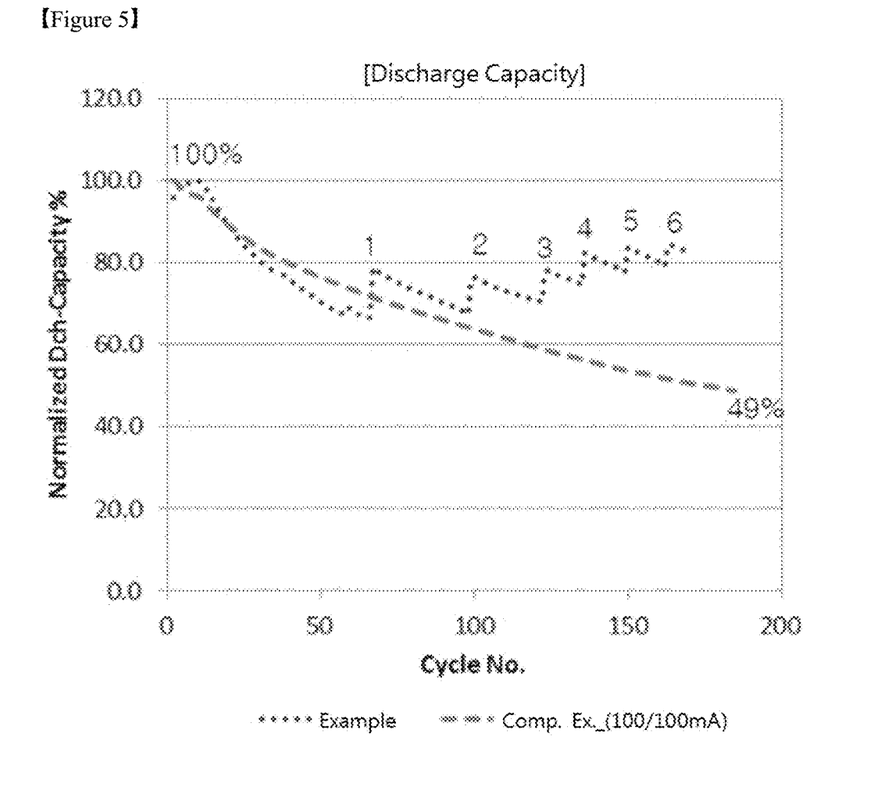
FIG. 5 is a graph plotted for capacities of batteries of Example 1 and Comparative Example 1.
Figure 6:
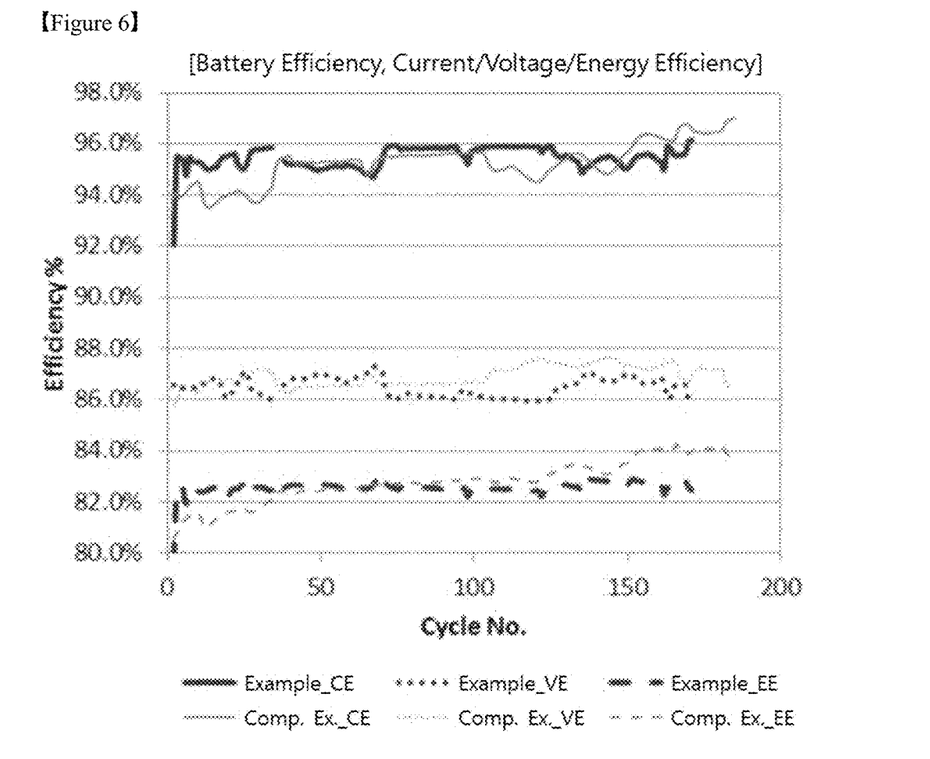
FIG. 6 is a graph plotted for efficiencies of the batteries of Example 1 and Comparative Example 1.

The experimental results are shown in FIGS. 5 and 6. FIG. 5 is a graph plotted for discharge capacities of the batteries of Example 1 and Comparative Example 1, and FIG. 6 is a graph plotted for current efficiency (CE), voltage efficiency (VE), and energy efficiency (EE).

Referring to FIG. 5, it can be seen that an effect of increase in capacity was immediately expressed when the electrolyte was transferred through the electrolyte transfer pipe in the case of Example 1 (indicated by 1 to 6). Changes in capacity of the batteries before/after transfer of the electrolyte are specifically listed in the following Table 1.

TABLE 1

| Cycle number | Capacity expressed with respect to initial discharge capacity |
|---|---|
| 1 | 66 → 67 |
| 2 | 98 → 99 |
| 3 | 122 → 123 |
| 4 | 135 → 136 |
| 5 | 149 → 150 |
| 6 | 162 → 163 |

| | |
|---|---|
| 1 | 67% → 79% |
| 2 | 67% → 76% |
| 3 | 70% → 77% |
| 4 | 75% → 82% |
| 5 | 78% → 84% |
| 6 | 79% → 84% |

Referring to Table 1, it can be seen that the capacity expressed whenever the electrolyte was transferred increased by approximately 5 to 12%, and that the battery capacity which had decreased before the transfer of the electrolyte was gradually restored with the continuous transfer of the electrolyte.

When the batteries of Example 1 and Comparative Example 1 were run for 170 cycles, it was confirmed that the battery of Comparative Example 1 had an expressed capacity of 50% with respect to the initial discharge capacity, and the battery of Example 1 had a very good expressed capacity of 83%.

Also, it was revealed that the battery of Example 1 having a high capacity maintenance rate as described above had battery efficiency comparable to the conventional battery (Comparative Example 1) (FIG. 6 and Table 2).

TABLE 2

| | Examples | | | | Comparative Examples | | | |
|---|---|---|---|---|---|---|---|---|
| Cycles | CE (%) | VE (%) | EE (%) | Capacity (%) | CE (%) | VE (%) | EE (%) | Capacity (%) |
| 10 | 95.3 | 86.5 | 82.4 | 100 | 94.5 | 86.3 | 81.6 | 96 |
| 50 | 95.0 | 87.0 | 82.7 | 70 | 95.3 | 86.5 | 82.5 | 76 |
| 100 | 95.8 | 86.1 | 82.5 | 76 | 95.6 | 86.7 | 82.9 | 64 |
| 150 | 95.1 | 87.0 | 82.7 | 84 | 95.7 | 87.3 | 83.5 | 53 |
| 170 | 96.1 | 85.9 | 82.6 | 83 | 96.7 | 86.7 | 83.9 | 50 |

From the results, it can be seen that the electrolyte storage unit for redox flow batteries according to the present invention has improved battery capacity characteristics because the electrolyte is passively regenerated during the battery driving. Therefore, a cycle of the electrolyte regeneration process may be delayed, thereby enhancing operational efficiency of the battery.

Also, the electrolyte storage unit of the present invention may be useful in continuously regenerating the electrolyte because a water level of the electrolyte in each of the storage tanks is automatically maintained, has high convenience in use, and may be easily handled and installed because electrolytes are not easily mixed even by external impact due to a configuration thereof including the water level sensing pipe and the electrolyte transfer pipe disposed on the water level sensing pipe.

BRIEF DESCRIPTION OF PARTS

10: positive electrode electrolyte storage tank
11, 21: pump
12: positive electrode electrolyte
20: negative electrode electrolyte storage tank
22: negative electrode electrolyte
30: power supply/load
31: positive electrode
32: negative electrode
33: separator
14, 24: water level sensing pipe
15, 25: water level sensor
16, 26: upper portion of electrolyte storage tank
17, 27: check valve
18: inlet of positive electrode electrolyte
19: outlet of positive electrode electrolyte
28: inlet of negative electrode electrolyte
29: outlet of negative electrode electrolyte
100: redox flow battery
200: electrolyte storage unit

The invention claimed is:

1. An electrolyte storage unit for redox flow batteries, comprising
　a positive electrode electrolyte storage tank;
　a negative electrode electrolyte storage tank,
　wherein each of the positive electrode electrolyte storage tank and the negative electrode electrolyte storage tank comprises a water level sensing pipe protruding perpendicularly from one end thereof, wherein the water level sensing pipe has a water level sensor provided therein;
　a "∩"-shaped electrolyte transfer pipe extending between the positive electrode electrolyte storage tank and the negative electrode electrolyte storage tank, wherein one end of the electrolyte transfer pipe extends into the water level sensing pipe extending from the positive electrode electrolyte storage tank and an other end of the electrolyte transfer pipe extends into the water level sensing pipe of the negative electrode electrolyte storage tank;
　a pump provided at the electrolyte transfer pipe to equally adjust a water level of an electrolyte in each of the tanks; and
　an electrical control unit configured to measure a water level of the electrolyte in each of the tanks using a water level sensor, thereby automatically operating the pump.

2. The electrolyte storage unit of claim 1, wherein at least one of the positive electrode electrolyte storage tank and the negative electrode electrolyte storage tank further comprises a check valve formed on upper portion thereof.

3. The electrolyte storage unit of claim 2, wherein at least one of the positive electrode electrolyte storage tank and the negative electrode electrolyte storage tank further comprises a pressure sensor formed therein, and comprises an electrical control unit configured to electrically connect the check valve to the pressure sensor so that the check valve is automatically operated according to an internal pressure of each of the storage tanks.

4. The electrolyte storage unit of claim 2, wherein the check valve comprises at least one selected from the group consisting of a lift check valve, a swing check valve, a ball check valve, a screw-down stop check valve, a butterfly check valve, a dual plate check valve, a single plate check valve, a tilting disc check valve, and a foot valve.

5. The electrolyte storage unit of claim 1, wherein, when it is assumed that a cross-sectional area of each of the positive electrode electrolyte storage tank and negative electrode electrolyte storage tank is A and a cross-sectional area of each of the water level sensing pipes of the electrolyte storage tanks is B, the ratio of A to B is in a range of 2:1 to 100:1.

6. A vanadium redox flow battery comprising the electrolyte storage unit defined in claim 1.

* * * * *